United States Patent [19]
Aebli et al.

[11] 3,897,421
[45] July 29, 1975

[54] ORGANIC COMPOUNDS

[75] Inventors: Horst Aebli, Basel; Fritz Fleck, Bottmingen, Basel-Land; Horst Schmid, Munchenstein, Basel-Land, all of Switzerland

[73] Assignee: Sandoz Ltd., Basle, Switzerland

[22] Filed: Dec. 3, 1973

[21] Appl. No.: 420,987

Related U.S. Application Data

[63] Continuation-in-part of Ser. No. 255,256, May 22, 1972, abandoned.

[52] U.S. Cl....... 260/240.1; 252/301.2 W; 252/543; 260/240 C
[51] Int. Cl. .................... C07d 85/98; C09b 23/14
[58] Field of Search .................... 260/240.1, 240 C

[56] References Cited
UNITED STATES PATENTS
3,759,900   9/1973   Horstmann.................... 260/240 C FOREIGN PATENTS OR APPLICATIONS
2,131,661   11/1972   France
2,025,792   5/1970   Germany Primary Examiner—Arthur P. Demers
Attorney, Agent, or Firm—Gerald D. Sharkin; Richard E. Vila; Joseph J. Borovian

[57] ABSTRACT

The present invention provides novel compounds of the formula:

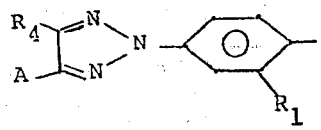

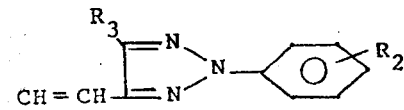

in which
R$_1$ signifies hydrogen, fluorine or chlorine atom, a carboxylic or sulphonic acid group or an amide or ester thereof, a cyano group or an alkylsulphonyl or arylsulphonyl group, R$_2$ signifies a hydrogen, fluorine or chlorine atom, a cyano group, a phenyl or alkyl radical which may be substituted, a carboxylic or sulphonic acid group or an amide or ester thereof, an alkylsulphonyl or arylsulphonyl group or a benzoxazole group which may be substituted, R$_3$ and R$_4$ independently signify a hydrogen, fluorine or chlorine atom, an alkyl radical of 1 to 6 carbon atoms which may be substituted, a cyano or carboxy group, a carboxylic acid amide or ester group, and R$_4$ may also signify an aryl radical which may be substituted, and A signifies a hydrogen atom or an alkyl or aryl radical which may be substituted or a group of formula II,

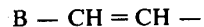

II in which B signifies an aryl or heterocyclic radical which may be substituted, and their water soluble sulphonated derivatives.

The compounds are useful as optical brighteners for various organic materials.

8 Claims, No Drawings

ORGANIC COMPOUNDS

This Application is a continuation-in-part of co-pending application Ser. No. 255,256, filed May 22, 1972 and now abandoned.

The invention provides novel triazolystryryl triazoles.

The invention provides compounds of formula I,

*[Structure of formula I shown]* in which
- $R_1$ signifies hydrogen, fluorine or chlorine atom, a carboxylic or sulphonic acid group or an amide or ester thereof, a cyano group or an alkylsulphonyl or arylsulphonyl group,
- $R_2$ signifies a hydrogen, fluorine or chlorine atom, a cyano group, a phenyl or alkyl radical which may be substituted, a carboxylic or sulphonic acid group or an amide or ester thereof, an alkylsulphonyl or arylsulphonyl group or a benzoxazole group which may be substituted,
- $R_3$ and $R_4$ independently signify a hydrogen, fluorine or chlorine atom, an alkyl radical of 1 to 6 carbon atoms which may be substituted, a cyano or carboxy group, a carboxylic acid amide or ester group, and $R_4$ may also signify an aryl radical which may be substituted, and
- A signifies a hydrogen atom or an alkyl or aryl radical which may be substituted or a group of formula II, $$B - CH = CH - \qquad II$$

in which B signifies an aryl or heterocyclic radical which may be substituted, and their water soluble sulphonated derivatives.

The invention also provides a process for the production of compounds of formula I which comprises reacting a hydrazine of formula III,

*[Structure of formula III shown]* in which $R_1$, $R_2$ and $R_3$ are as defined above, with an iso-nitroso compound of formula IV,

*[Structure of formula IV shown]* in which one of $Z_1$ and $Z_2$ signifies an oxygen atom and the other Z signifies =N—OR,
in which R signifies hydrogen or an acyl group, preferably an acetyl group,
and A and $R_4$ are as defined above,
and dehydrative cyclization of the reaction product to form the compound of formula I,
or by oxidative cyclization to the v-triazole-1-oxide compound and reduction of this to the compound of formula I and in the latter case when $Z_1$ signifies =N—OH and $R_4$ signifies H with optional replacement of the $R_4$ substituent by a chlorine atom before or after reduction of the triazole-N-oxide compound to the corresponding triazole compound, or b. condensing a compound of formula V,

*[Structure of formula V shown]* in which $R_1$, $R_3$, $R_4$, A and $Z_1$ and $Z_2$ are as defined above,
with a hydrazine of formula VI,

*[Structure of formula VI shown]* in which $R_2$ is as defined above,
and direct dehydrative cyclization of the product to the compound of formula I or oxidative cyclization to the v-triazole-1-oxide compound and reduction of this to the compound of formula I, and in the latter case, when $Z_1$ signifies =N—OH and $R_3$ signifies hydrogen, with optional replacement of the $R_3$ hydrogen substituent by a chlorine atom before or after reduction of the triazole-N-oxide compound to the corresponding triazole compound, or c. reacting a compound of formula VII,

*[Structure of formula VII shown]* with a compound of formula VIII,

*[Structure of formula VIII shown]* in which formulae VII and VIII, $R_1$ to $R_4$ and A are as defined above, and one of the v and w signifies a —CHO group or a functional derivatives thereof and the other signifies a —CH$_2$—t$_1$ group, in which t$_1$ signifies hydrogen —CN, —COOH, a carboxylic acid ester or amide group

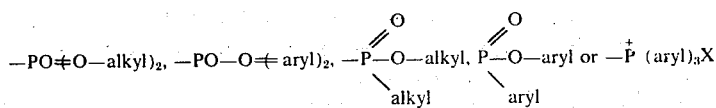

in which alkyl is preferably alkyl lower, e.g. with 1 to 6 carbon atoms, may be substituted, e.g. by methoxy, ethoxy, phenyl or phenoxy, and includes cycloalkyl, e.g. cyclohexyl; aryl is preferably (optionally substituted) phenyl; and $X^-$ is a monovalent anion, e.g. $Cl^-$, $Br^-$, $I^-$, $CH_3-O-SO_3^-$, $C_2H_5-O-SO_3^-$, $CH_3-SO_3^-$, with cleavage of the substituent $t_1$ where necessary, or d. oxidative cyclization of a compound of formula IX,

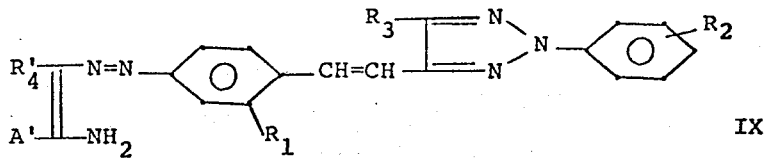

in which $R_1$, $R_2$ and $R_3$ are as defined above,
A' signifies an alkyl or aryl radical which may be substituted or a group of formula II as defined above,
$R'_4$ signifies —CH, —COOH or a carboxylic acid amide or ester group,
to form a compound of formula Ia,

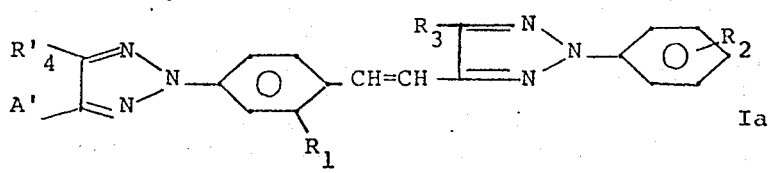

in which $R_1$, $R_2$, $R_3$, $R'_4$ and A' are as defined above, or e. oxidative cyclization of a compound of formula X,

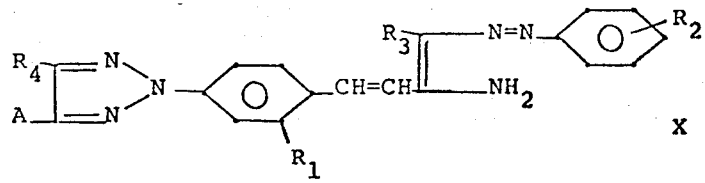

in which $R_1$, $R_2$, $R_4$ and A are as defined above, and $R_3$ signifies —CN, —COOH or a carboxylic acid ester or amide, to form a compound of formula Ib,

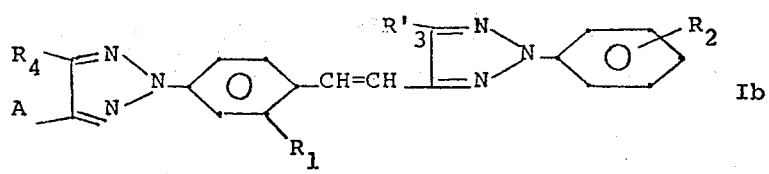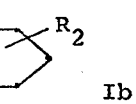

in which $R_1$, $R_2$, $R'_3$, $R_4$ and A are as defined above.

When a substituent $R_1$ to $R_4$ is a carboxylic acid ester group it is preferably an alkylester group of a carboxylic acid which has 1 to 8 carbon atoms in the alkyl radical and may be substituted by alkoxy, phenyl or phenoxy radicals or a cycloalkylester or arylester group of a carboxylic acid, preferably those of the naphthalene, diphenyl and in particular the benzene series. Examples of suitable carboxylic ester groups are the methyl, ethyl, n-propyl, iso-propyl, n-butyl, isobutyl, n-amyl, iso-amyl, n-hexyl, n-octyl, 2-ethylhexyl, 2-methoxyethyl, 2-ethoxyethyl, 2-n-butoxyethyl, 2-(2'-methoxyethoxy)-ethyl, 2-(2'-ethoxyethoxy)-ethyl, 2-(2'-n-butoxyethoxy)-ethyl, benzyl, 2-phenylethyl, 2-phenoxyethyl, cyclohexyl, 4-methylcyclohexyl, 4-diphenylyl, naphthyl-1, naphthyl-2, phenyl, 2-, 3- and 4-methylphenyl, 2-, 3 and 4-chlorophenyl, 2- and 4-methoxyphenyl, 2- and 4-ethoxyphenyl, 4-fluorophenyl, 2,4- and 2,5-dimethylphenyl-, 4-n-butylphenyl, 4-tert. butylphenyl, 4-tert. amylphenyl and 4-tert. octylphenyl ester groups.

If $R_1$ and/or $R_2$ are sulphonic acid ester groups, the sulphonic acid ester groups corresponding to the aforenamed carboxylic acid ester groups are suitable substituents.

When a substituent $R_1$ to $R_4$ is a carboxylic acid amide group or a substituent $R_1$ or $R_2$ is a sulphonic acid amide group, the amide is preferably a monoalkylamide, dialkylamide, mono- and di-(hydroxyalkyl)-amide, alkoxyalkyl- and alkoxyalkoxyalkylamide, arylamide, aralkyl-, aryloxyalkyl- and cycloalkylamide, N-alkyl- or N-hydroxyalkyl-N-phenylamide group, in which alkyl and hydroxyalkyl may contain, e.g., 1 to 6 or, preferably, 1 to 4 carbon atoms, alkoxyalkyl and alkoxyalkoxyalkyl containing preferably 3 to 6 and 5 to 8 carbon atoms respectively, aryl and aryloxy may be binuclear or, preferably, mononuclear.

Specific examples are the following amide groups of carboxylic and sulphonic acids: methyl, ethyl, n-propyl, iso-propyl, n-butyl, sec. butyl, iso-butyl, n-amyl, n-hexyl, iso-amyl, dimethyl, diethyl, di-n-butyl, 2-hydroxyethyl, 2- and 3-hydroxypropyl, 4-hydroxybutyl, di-(2-hydroxyethyl), di-(2-hydroxypropyl)-, 2-methoxyethyl, 2-ethoxyethyl, 2-n-butoxyethyl, 3-methoxypropyl, 4-methoxybutyl, 2-(2'-methoxyethoxy)-ethyl, 2-(2'-ethoxyethoxy)-ethyl, 2-(2'-n-butoxyethoxy)-ethyl, phenyl, 2-, 3- and 4-methylphenyl, 2-, 3- and 4-chlorophenyl, 2- and 4-methoxyphenyl, 2- and 4-ethoxyphenyl, 4-tert. butylphenyl, 4-n-butylphenyl, 2,4- and 2,5-dimethylpheny, 4-diphenylyl, naphthyl-1, naphthyl-2, N-methyl-N-phenyl, N-ethyl-N-phenyl, N-2-hydroxyethyl-N-phenyl, cyclohexyl, 4-methylcyclohexyl, benzyl, phenylethyl and phenoxyethyl amide groups.

When $R_1$ or $R_2$ signifies an alkylsulphonyl group it may contain, e.g., 1 to 6 carbon atoms (n-propyl-, iso-propyl-, n-butyl-, iso-butyl-, n-amyl-, iso-amyl- or n-hexyl-sulphonyl and in particular methylsulphonyl and ethysulphonyl). The arylsulphonyl significances of $R_1$ or $R_2$ preferably contain aryl radicals of the benzene series such as phenyl-, methylphenyl- and chlorophenyl-sulphonyl.

When $R_2$ signifies an optionally substituted alkyl radical this may be branched or unbranched, and preferably contains 1 to 18 carbon atoms especially 1 to 8 carbon atoms and may bear as substituents, e.g., halogen atoms, cyano, hydroxyl, alkoxy, aryl or aryloxy groups, preferably of the benzene series and examples of suitable optionally substituted alkyl radicals are methyl, ethyl, n-propyl, iso-propyl, n-butyl, iso-butyl, sec. butyl, tert. butyl, n-amyl, tert. amyl, iso-amyl, sec. amyl, n-hexyl, n-octyl, 2-ethylhexyl, tert. octyl, n-decyl, n-dodecyl, cetyl, stearyl, 2-methoxyethyl, 2-ethoxyethyl, 2-n-butoxyethyl, 3-methoxypropyl, 4-methoxybutyl, 2-hydroxyethyl, 2- and 3-hydroxypropyl, 2-chloroethyl, 2,2-difluoroethyl, trifluoromethyl, cyanomethyl, cyanethyl, 2-phenoxyethyl, benzyl, 2-phenylethyl and cumyl.

When $R_2$ signifies an optionally substituted phenyl radical it may be, for example, phenyl, 2-, 3- or 4-methylphenyl, 2-, 3- or 4-chlorophenyl, 2- or 4-methoxyphenyl, 2- or 4-ethoxyphenyl, 4-fluorophenyl, 4-ethyl-, 4-iso-propyl-, 4-tert. butyl-, 4-tert. amyl-, 4-tert. octyl-phenyl, 2,4- or 2,5-dimethylphenyl, 2-, 3- or 4-carboxyphenyl, 2-, 3- or 4-cyanophenyl, 2-, 3- or 4-aminocarbonylphenyl, 2-, 3- or 4-methylamino- or 2-, 3- or 4-dimethylamino-carbonylphenyl, 2-, 3- or 4-ethoxy-, n-butoxy-, benzyloxy-, cyclohexyloxy-, phenoxy- or cresoxy-carbonylphenyl, 3- or 4-sulphophenyl, 3- or 4-amino-, methylamino- or dimethylaminosulphonylphenyl, 3- or 4-methoxy-, n-butoxy-, benzyloxy-, cyclohexyloxy-, phenoxy- or cresoxy-sulphonylphenyl.

If $R_2$ signifies a substituted benzoxazole radical, the substituents may be chosen, for example, from alkyl or alkoxy radicals having 1 to 8 carbon atoms which may themselves be substituted, aryl or aryloxy radicals which may themselves be substituted, chlorine or fluorine atoms, cyano groups, sulphonic acid or sulphonamide groups, alkylsulphonyl or arylsulphonyl groups. Examples of alkyl and alkoxy radicals which may themselves be substituted are methyl to octyl, benzyl, 2-phenoxyethyl, methoxy, ethoxy, n-butoxy, n-octyloxy, cyclohexyl etc. Of the aryl and aryloxy radicals, those of the benzene series are especially preferred: phenyl, methylphenyl, chlorophenyl, fluorophenyl, methoxyphenyl, ethoxyphenyl, cyanophenyl, and the corresponding phenoxy compounds.

If the substituents $R_3$ to $R_4$ are alkyl radicals, these contain only 1 to 6 carbon atoms (methyl to hexyl) and may bear the same substituents as given for $R_2$.

Examples of optionally substituted aryl radicals as significances for $R_4$ are the binuclear naphthyl-1, naphthyl-2 and diphenyl-4 radicals and in particular the phenyl radicals described above for $R_2$.

When A signifies optionally substituted alkyl or aryl, it may have one of the meanings given above for $R_2$, $R_3$ and $R_4$; if it stands for an aryl radical it may in addition correspond to one of the following formulae:

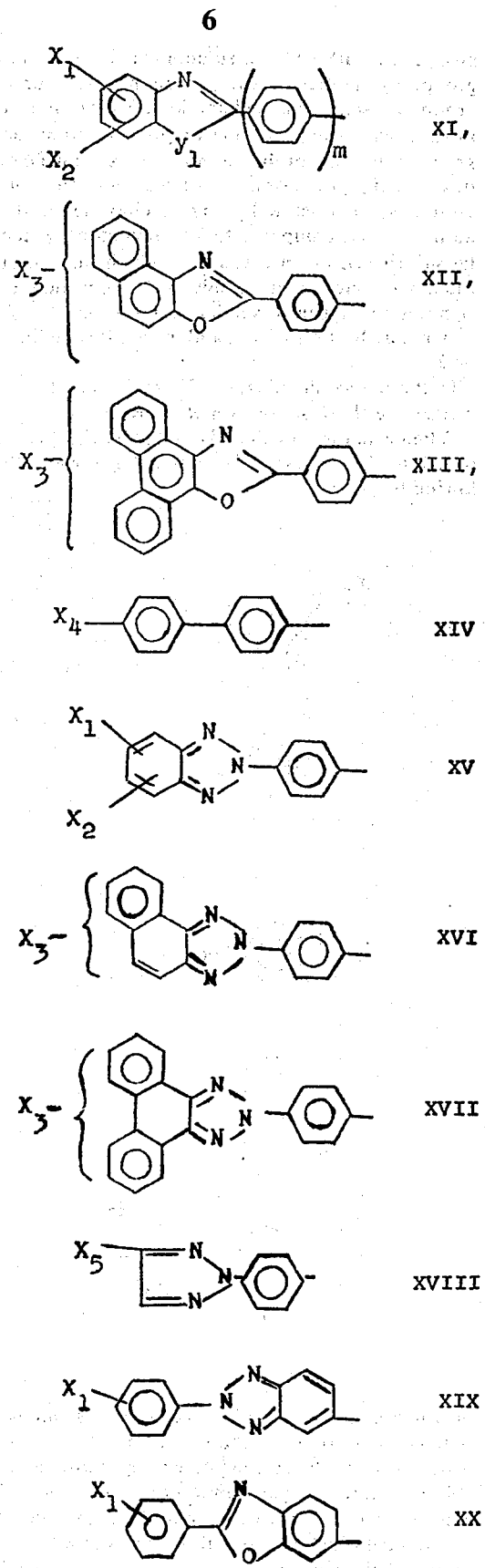

in which $X_1$ and $X_2$, independently, signify a hydrogen, chlorine or fluorine atom, an alkyl or alkoxy group having 1 to 6 carbon atoms in the alkyl or alkoxy radical which may be substituted, aryl or aryloxy group which may be substituted and which is preferably of the benzene series, a nitrile, carboxylic acid or sulphonic acid group, or a carboxylic or sulphonic acid amide or ester group, $X_3$ signifies a hydrogen atom, a sulphonic acid group or a sulphonic acid amide or ester group, $X_4$ signifies a hydrogen, chlorine or fluorine atom, an aryl group, preferably of the benzene series, a nitrile or carboxylic acid group, or a carboxylic acid amide or ester group, $X_5$ signifies a hydrogen, chlorine or fluorine atom, an alkyl group of 1 to 6 carbon atoms which may be substituted or an aryl group which may be substituted and which is, preferably of the benzene series, $y_1$ signifies an oxygen or sulphur atom or an imino group which may be substituted, and m signifies the integer 1 or 2.

In the above significances $X_1$ to $X_5$ suitable significances are those set out for $R_1$ to $R_4$ above.

When B in the radical of formula (II) signifies an aryl or hetero ring, it may, for example, have one of the following formulae:

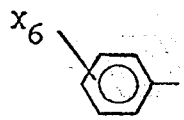 XXI

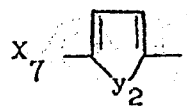 XXII

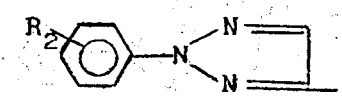 XXIII

 XXIV

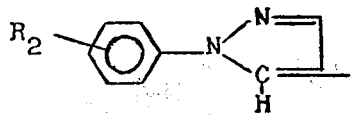 XXV in which $R_2$ is as defined above, and $X_6$ signifies $X_1$ as defined above or an aromatic heterocyclic racical, e.g., a benzoxazole, benzotriazole or naphthotriazole radical, $X_7$ signifies a hydrogen atom, an alkyl radical with 1 to 6 carbon atoms which may be substituted or an aryl radical which may be substituted and which is preferably of the benzene series, $y_2$ signifies an oxygen or sulphur atom, and the pyridine nucleus in formula XXIV may be substituted.

The condensation step of process variant (a) or (b) may be conveniently effected in an inert organic, preferably polar solvent, e.g. in an aliphatic or aromatic, preferably halogenated or nitrated, hydrocarbon, in an alcohol, ether, glycol, amide, e.g., formamide, dimethyl formamide, dimethyl acetamide, N-methyl pyrrolidone, phosphoric tris-(dimethylamide), in a nitrile, e.g. acetonitrile, in a sulphoxide or sulphone, e.g. dimethyl sulphoxide or tetramethylene sulphone, or in a lower alkanecarboxylic acid, e.g. acetic or propionic acid. Suitable reaction temperatures are from 0° to 100°C, preferably 20° to 60°C. The reaction is preferably effected in the presence of an acid, preferably an organic lower carboxylic acid, e.g. formic, acetic, propionic, butyric, oxalic, tartaric, lactic or citric acid.

The dehydrative cyclization reaction can be conveniently carried out by heating in the presence of an organic solvent and preferably a tertiary base, together with at least the amount of a dehydrating agent necessary for splitting off 1 mol of water.

Examples of suitable dehydrating agents are the halides of phosphoric acid such as phosphorus trichloride, oxychloride and pentachloride, and the halides, amides and, preferably, the anhydrides of carboxylic acids, preferably those anhydrides of the lower fatty acids such as acetic, propionic or butyric acid and mixed anhydrides thereof. Among the carboxylic amides, urea as the diamide of carbonic acid holds a special position. With this dehydrating agent both the hydrazonoximes and their O-acyl derivatives, preferably their O-acetyl derivatives, can be converted into the corresponding compounds of formula I.

The O-acyl derivatives of the hydrazonoximes can also be formed by the reaction of hydrazonoximes with acylating agents, e.g. acetic anhydride, if necessary in the presence of a tertiary base such as pyridine, in accordance with the known methods.

An anhydride of a lower fatty acid is an especially preferred dehydrating agent and is preferably used in excess.

Solvents suitable for the hydrazonoximes and their O-acyl derivatives are those inert solvents which do not affect the dehydrating agents; examples are aromatic and chlorinated hydrocarbons, ethers, ketones, acid amides, sulphoxides and sulphones. Especially valuable solvents are acid amides, sulphoxides and sulphones, e.g. dimethyl formamide, diethyl formamide, dimethyl acetamide, N-methylpyrrolidone, dimethyl sulphoxide, dibutyl sulphoxide, tetramethylene sulphone (sulpholan) and phosphoric tris-(timethylamide).

Depending on the solubility of the hydrazonoxime, the solvent is usually employed in an amount which is equal to or several times greater than the weight of the hydrazonoxime.

The tertiary base may be used in stoichiometric or catalytic amounts. Of the tertiary bases whose presence promotes the reaction, special mention may be made of diethylaminobenzene, dimethylaminobenzene, quinoline, pyridine, alkylpyridines and technical mixtures of pyridine bases.

The favourable temperatue range for the cyclization reaction giving the triazole is 20° to 200°C, in particular from 50° to 175°C. The reaction is preferably carried out stepwise, e.g. first at 80°C, then at 100°C and finally at boiling temperature.

Cyclization to the triazole of formula I can also be accomplished simply by heating in the presence of a carboxylic acid amide, preferably urea, suitably at a temperature of 100° to 210°C, preferably 120° to 175°C. It is not necessary to dry the hydrazonoxime prior to cyclization. The moist hydrazonoxime can be added, for example, to a urea melt. During the heating-up period the water evaporates and cyclization takes place. It is preferred to employ two to twenty times, especially three to fifteen times the amount of urea in relation to the dry amount of the hydrazonoxime. A combination of urea and a lower fatty acid, e.g. acetic acid, is particularly advantageous.

The oxidative cyclization may be effected by the action of a wide variety of oxidizing agents; for this reaction the use of oxidation-stable solvents is advisable. Suitable oxidizing agents include bichromate and hydrogen peroxide in acid, for example acetic acid solution, and potassium ferricyanide in basic solvents such as pyridine and pyridine-water mixtures. A generally employable and preferred process consists in oxidation with a copper (II) salt such as copper (II) sulphate, chloride or acetate in a pyridine-water mixture. The cupric salts can be employed in stoichiometric amounts or in excess of or below the stoichiometric amount. The monovalent copper formed in the reaction can be continuously converted into the divalent stage during the reaction by blowing in air or oxygen.

The reduction of the triazole oxides to the final compounds is carried out in conventional manner, preferably using nascent hydrogen from a base metal and an acid, especially zinc dust in acetic acid, in an acetic acid-water mixture or in a mixture of acetic acid and an inert organic solvent, preferably chlorobenzene. The reaction can be conveniently carried out at temperatures from room temperature to about 150°C, the preferred range being 60° to 130°C. The reduction can also be carried out at a lower temperature, if necessary with a small addition of an inorganic acid, e.g. hydrochloric acid, for acceleration. The salts of reducing acids of sulphur or phosphorus can also be used for reduction.

Simultaneously with reduction of the oxide to the v-triazole ring, treatment of the triazole oxide with hydrogen chloride leads to the introduction of a chlorine atom in the 5-position of this ring adjacent to the N-oxide grouping, when $R_3$ or $R_4$ stand for hydrogen. This reaction is preferably conducted with gaseous hydrogen chloride, which is introduced into a dispersion of the N-triazole oxide in a mixture of water and a water-soluble organic solvent, preferably an alcohol or ether e.g. ethanol, propanol, butanol, methyl glycol, ethyl glycol, ethylene glycol, diethylene glycol or dioxan, at the reflux temperature of the reaction mixture. These chlorine-containing compounds can also be formed by reacting the N-triazole oxide with a chlorinating agent, e.g. sulphuryl chloride, thionyl chloride or phosphoryl chloride, in a solvent inert to halogenation, with subsequent reduction with nascent hydrogen to the 5-chloro-N-triazole compound as described above.

In process variant (c) the reaction of a compound of formula VII with a compound of formula VIII, in which the aldehyde group is present as such or in the form of a derivative, e.g. the oxime, hydrazone, azine or anile, is preferably carried out in the presence of a suitable condensing agent or catalyst, e.g. boric acid, zinc chloride, arylsulphonic acid, an alkali or alkaline-earth metal salt of an arylsulphonamide, acetic anhydride, an alkali metal acetate, piperidine, an alkali or alkaline-earth metal hydroxide or an alkali or alkaline-earth metal alcoholate. Suitable temperatures are from 0° to 200°C, preferably from 20° to 160°C. If $t_1$ stands for hydrogen, the progress of the reaction is assisted if the adjacent benzene nucleus bears a negative substituent, e.g., —CN, —COOH, —SO$_3$H or an optionally substituted ester or amide group of a carboxylic or sulphonic acid. If a radical $t_1$ other than hydrogen is present in the reaction product, it is removed by suitable means, or more exactly is replaced by a hydrogen atom. With a reaction product is which $t_1$ is a COOH group, this removal can be effected, for example, by heating to about 200°C in a solvent of high boiling point, e.g. a tertiary amine such as quinoline; if $t_1$ is a cyano, carboxylic amide or ester group the step is carried out with prior acid or alkaline saponification of this group to the carboxy group. If, however, $t_1$ in the starting product is a phosphorus-containing ester group, this group is replaced by a hydrogen atom during the course of the reaction of the compounds of formulae VII and VIII.

The reaction can be carried out effectively by fusing the reactants, though it is preferred to use an inert solvent, e.g. an aliphatic or aromatic, preferably halogenated hydrocarbon, one of the alcohols, ethers or glycols, an amide such as formamide, dimethyl formamide or acetamide, N-methylpyrrolidone, phosphoric tris-(dimethylamide), acetonitrile, dimethyl sulphoxide, tetramethylene sulphone.

In the above process variants (a), (b) and (c) the reactants are preferably used in approximately equimolar proportions.

The oxidative cyclization of compounds of formulae IX or X in process variants (d) and (e) can be conveniently carried out in the presence of an oxidation-stable organic solvent, such as: hydrocarbons, including halogenated or nitrated hydrocarbons, e.g. benzene, toluene, chlorobenzene, ortho-dichlorobenzene, bromobenzene, nitrobenzene, 1-2-dichlorethane, 1,1,2,2-tetrachlorethane; amides, e.g. dimethyl formamide, dimethyl acetamide, phosphoric tris-(dimethylamide); sulphones, e.g. tetramethylene sulphone; ethers, e.g. methoxybenzene, ethoxybenzene, dioxan, 1,2-dimethoxy- and 1,2-diethoxy-ethane; and tertiary amines, e.g. dimethylamino- and diethylaminobenzene, triethylamine, tri-(n-butyl)-amine, pyridine, picoline, quinoline and mixtures of pyridine bases.

Suitable oxidizing agents include alkali metal hypohalogenites, preferably sodium hypochlorite or hypobromite; inorganic and organic copper (II) compounds such as copper (II) chloride, sulphate, acetate, carbonate and naphthenate, which are employed preferably in the presence of nitrogenous bases such as ammonia, amines such as trimethylamine, ethanolamine, diethanolamine, triethanolamine and pyridine; and air or oxygen in the presence of a copper (II) compound, of which the latter can be employed in catalytic to stoichiometric amounts or in excess.

The oxidative cyclization reaction can be conveniently effected at temperatures ranging from 0° to 150°C, the preferred ranges being from room temperature to 40°C when the oxidizing agent is one of the alkali hypohalogenites and 80° to 130°C for oxidization with a copper compound alone or with oxygen or air in the presence of a copper (II) compound in an amount of, e.g., up to 10 % of the stoichiometric amount.

The compounds of formula I may be isolated by the known methods, e.g. by cooling, dilution with a suitable agent, partial or complete evaporation of the solvent or solvents, steam distillation etc., followed by filtration, washing if necessary, and drying and purified in conventional manner.

It will be appreciated that the compounds of formula I may be converted into further compounds by substitution and/or further cyclization. Thus, for example, in a compound of formula I in which one of the substituents is, or has a substituent, an acid group, such group may be converted into an ester or amide group. Also, for example, a compound of formula I in which A and/or $R_2$ signifies an amide of an o-hydroxyarylamine with a carboxylic or phenylcarboxylic acid radical, may be subjected to dehydrative cyclization to form a compound of formula I in which A and/or $R_2$ is a naphthoxazolyl, benzoxazolyl, naphthoxalylphenyl or benzoxazolylphenyl radical.

To convert water-insoluble triazolyl styryl triazoles of formula I into the corresponding water-soluble sulphonated compounds they can be treated with sulphonating agents, e.g. concentrated sulphuric acid of 90 to 100 % strength, weak oleum with an $SO_3$ content of up to about 30 %, chlorosulphonic acid or gaseous sulphur trioxide. The temperature may range from 0° to about 100° C, or preferably from 20° to 50°–60°C, and sulphonation is continued until the number of sulphonic acid groups, e.g. 1 to 3, required to impart solubility in water has been introduced. If chlorosulphonic acid or gaseous sulphur trioxide is used, sulphonation proceeds satisfactorily in an inert solvent such as sulphuric acid, ortho-dichlorobenzene or nitrobenzene, while if concentrated sulphuric acid or oleum is chosen the sulphonating agent itself may serve as solvent. The compounds of formula VII in which $v$ signifies —CHO and $R_1$ signifies $SO_3H$ can be produced from the 4,4'-bis-[4''-phenyl-v-triazolyl-2'']-stilbene-2,2'-disulphonic acids disclosed in British Patent 1,108,416 by cleavage with potassium permangate in aqueous-alkaline medium (see German Patent 115,410).

The compounds of formula VIII in which $w$ stands for —$CH_2$—PO=(O—alkyl)$_2$ can be derived from the corresponding compounds bearing a —$CH_2$—Cl group by reaction with a trialkyl phosphite.

The starting compounds of formula IX, as defined above, can be produced, for example, by coupling diazo compounds from amines of formula XXVI,

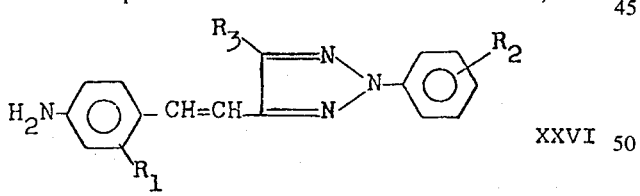

XXVI with enamines of formula XXVII

XXVII in which $R_4'$ and $A'$ are as defined above, or with their tautomeric ketimides, e.g. with β-aminocrotonic nitrile, ester or amides or with β-aminocinnamic nitrile, ester or amides. In an analogous manner, compounds of formula X as defined above can be obtained by coupling diazo compounds from amines of formula XXVIII,

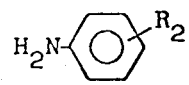

XXVIII in which $R_2$ is as defined above, with enamines of formula XXIX,

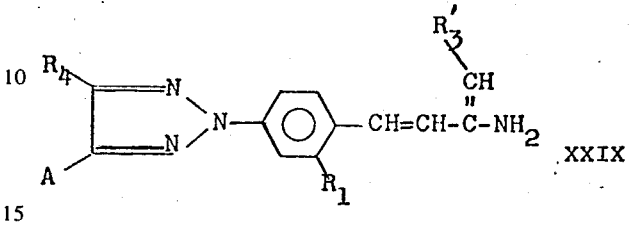

XXIX in which $R_1$, $R_3'$, $R_4$ and A are as defined above, or with their tautomeric ketimides.

In so far as the production of the starting materials is not described, the compounds are known or may be prepared by known processes, or in a manner analogous to known processes. The new triazolylstyryl triazoles of formula I possess properties suitable for the optical brightening of a wide variety of organic materials and polymeric materials.

A preferred group of optical brighteners according to this invention are those of formula Ic,

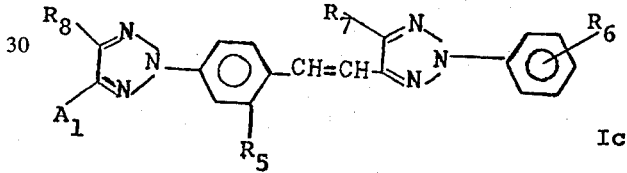

Ic in which $R_5$ signifies the sulphonic acid, sulphonic amide, carboxylic amide or nitrile group, $R_6$ signifies a hydrogen or chlorine atom, an alkyl radical having 1 to 4 carbon atoms or the carboxylic amide or nitrile group, $R_7$ signifies a hydrogen or chlorine atom or the methyl, hydroxymethyl, chloromethyl or acetoxymethyl group, $R_8$ signifies a hydrogen or chlorine atom or the phenyl or methyl group, $A_1$ signifies the phenyl, styryl, methylstyryl or nitrilostyryl radical or a radical of formula

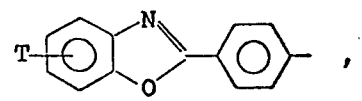

in which T signifies a hydrogen atom or an alkyl radical of 1 to 4 carbon atoms.

An especially preferred group of optical brighteners according to the invention are of formula Id,

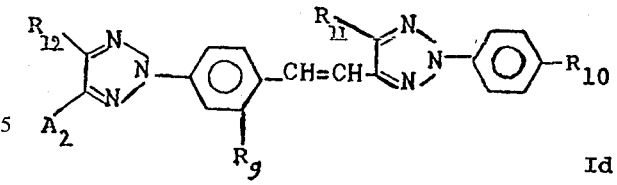

Id in which
- R$_9$ signifies the nitrile group or the sulphonic acid group (which may be present as an alkali metal salt, preferably the sodium salt),
- R$_{10}$ signifies a hydrogen atom or the nitrile group,
- R$_{11}$ signifies a hydrogen or chlorine atom or the methyl group,
- R$_{12}$ signifies a hydrogen or chlorine atom or the methyl group,
- A$_2$ signifies the phenyl radical or a radical of formula

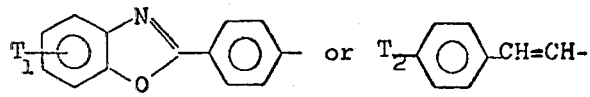

in which
- T$_1$ signifies a hydrogen atom or the methyl or tertiary butyl radical, and
- T$_2$ signifies a hydrogen atom or the methyl or nitrile group.

By "organic materials" are understood natural fibres, e.g. cellulose (paper and cotton) and natural polyamides (wool, silk), and by "polymeric materials" the synthetic and semi-synthetic polymers, e.g. polyesters, polyamides, polyurethanes, polyolefins and optionally, modified polyolefins, polypropylene including polypropylene modified by the introduction of basic groups), polyvinyl acetate, polyvinyl chloride, polyvinylidene chloride, polyacrylonitrile and modified polyacrylonitrile and acrylonitrile, polystyrene, cellulose (2 1/2) acetate and cellulose triacetate.

The compounds of formula I can be applied to the substrate desired to be brightened by any of the standard exhaust, padding or printing methods, either in the form of solutions in water or an organic solvent or as aqueous dispersions. But they can also be advantageous as brightener additives in spinning solutions and melts, in plastics moulding materials, and in the monomers or prepolymers for the synthesis of polymers. For this latter purpose the water-insoluble triazolylstyryl triazoles of formula I are preferable.

Depending on the method of application, the disclosed compounds are employed in amounts of 0.001 to 0.5 & or preferably 0.01 to 0.2 % in relation to the weight of the material. They are suitable for use alone or in combination with other optical brighteners, and may be applied in the presence of surface-active agents, for instance detergents, carriers, and chemical bleaching agents. An effective method of brightening heat-stable synthetic fibres, notably polyester fibres, in fabric form is to pad the selected compound of formula I on the fabric from an aqueous medium containing a surface-active agent and to treat the fabric in dry heat, e.g. at 150°-240°C or preferably 180°-220°C, in accordance with the "thermosol" process.

The disclosed brighteners have a distinct reddish violet to blue fluorescence shade, a high saturation limit, good sublimation fastness and good light fastness. The water-soluble compounds containing sulphonic acid groups can be incorporated in powder, paste or liquid detergents in amounts of, e.g. 0.001 to 0.5% relative to the solid content of the detergent. This group of brighteners may also be used for the optical brightening of cellulosic fibres (cotton, linen, hemp, paper, rayon) and polyamide fibers (wool, silk, hair fibres, polyamide 6, 66, 610, 11 etc.) by the exhaust technique and, in particular, for the optical brightening of nonwovens and carpets by discontinuous or continuous padding processes. In the following Examples the parts and percentages are by weight and the temperatures in degrees centigrade. The melting points are uncorrected.

EXAMPLE 1

21 Parts of 4-hydrazino-2-cyano-β-(2'-phenylosotriazolyl)-styrene are dissolved in 67 parts of dimethyl formamide at room temperature. 43 Parts of 50% acetic acid are added, then in the course of 1 hour 19.7 parts of 1-p-benzoxyzolyl-phenyl-1-hydroxyiminoacetone are gradually added with thorough stirring. The reaction mixture is stirred further for 3 hours at room temperature and 2 hours at 60°, cooled slowly to 3° and filtered with suction to separate the yellow-brown precipitate. This is washed with 64 parts of methanol cooled in ice and dried at 60° with vacuum to give 28 parts of the hydrazonoxime. Without further purification the hydrazonoxime is dissolved in 58 parts of dimethyl formamide, followed with constant stirring by 54 parts of pyridine and then by 27.5 parts of acetic anhydride. In the space of 2 hours the temperature is increased to 80° and in a further hour to about 135° (reflux). The batch is cooled slowly to 5°, the yellow precipitate filtered with suction, washed with ice-cold methanol and dried at 80° with vacuum. After recrystallization several times from chlorobenzene, pale yellow crystals are obtained with melting point 255°-257° which fluoresce with a red-violet shade in chlorobenzene solution and agree with the formula

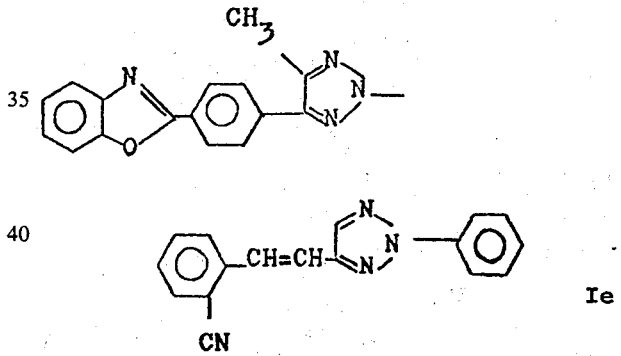

(λmax. in CHCl$_3$ : 365 nm).

The 4-hydrazino-2-cyano-β-(2'-phenylosotriazolyl)-styrene used as starting product can be produced as follows.

57.4 Parts of 4-amino-2-cyano-β-(2'-phenylosotriazolyl)-styrene (see Belgian Patent 722,920) are suspended in 415 parts of 2-methoxyethanol and the suspension added to a thoroughly stirred mixture of 95 parts of concentrated hydrochloric acid, 165 parts of ice and 115 parts of water. After stirring for 3 hours at 10° the beige suspension is cooled to 0° and diazotized by the addition of a solution of 13.8 parts of sodium nitrite in 30 parts of water. The reaction mixture is stirred for a further 2 hours at 0°-5°, after which the excess nitrous acid is decomposed with urea. The diazonium salt mixture is stirred well into a mixture of 135 parts of tin (II) chloride and 225 parts of concentrated hydrochloric acid, and cooled to 10°. Stirring is continued for 4 hours at −5° to 0°. The precipitate is filtered off with suction, treated on the filter with 205 parts of concentrated ammonia, washed well with water after the treatment, purified by dissolving in 2-methoxyethanol and precipitating with water, and finally vacuum dried at 70°. A yellow compound of formula

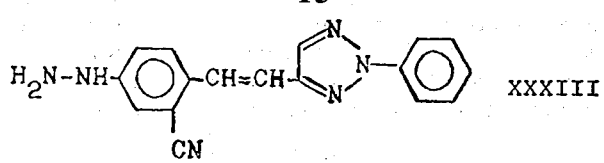

XXXIII melting point 140°–144°, is obtained in a yield of 51 parts.

EXAMPLE 2

20 parts of 4-hydrazino-2-cyano-β-(2'-phenylosotriazolyl)-styrene are condensed with 22.7 parts of 1-p-(5'-tert.butyl-benzoxazolyl)phenyl-hydroxy-iminoacetone as described in Example 1. Without further purification, the resulting hydrazonoxime compound is cyclized by the method there given. The crude product, which is obtained in a yield of 19 parts, is recrystallized several times from glacial acetic acid or from chlorobenzene with the aid of bleaching earth and the addition of a small amount of zinc dust, on which almost colorless crystals with melting point 224°–226° are obtained. They dissolve readily in nearly all organic solvents, show red-violet fluorescence and have the formula

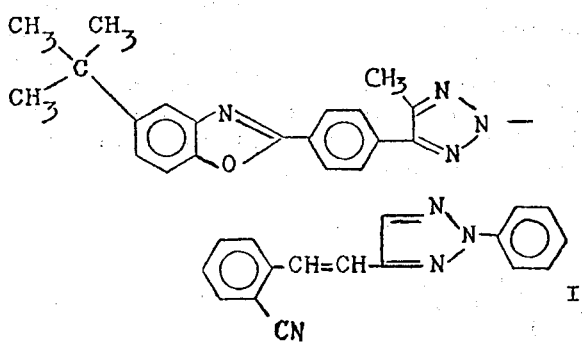

If (λmax. in CHCl₃: 365 nm)

EXAMPLE 3

20 Parts of the hydrazonoxime of formula

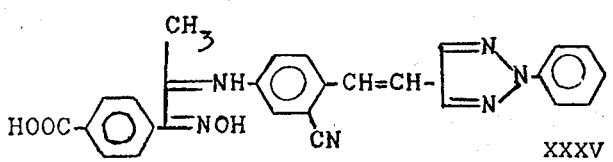

XXXV are suspended in 40 parts of dimethyl formamide, with the subsequent addition of 60 parts of acetic anhydride and 60 parts of pyridine. The suspension is held for 2 hours at 80°, for 2 hours at 100° and then for 30 minutes at boiling temperature. When it has cooled the yellow-brown precipitate is filtered, washed with ice-cold methanol and dried. The product has the formula,

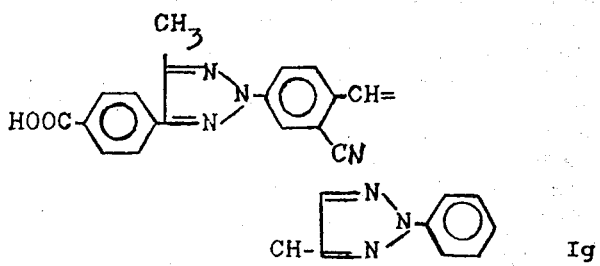

Ig and can be reacted by one of the two following methods (a) or (b).

a. 15 Parts of the p-carboxyphenyl triazole compound, 6 parts of 1-hydroxy-2-aminobenzene and 8 parts of boric acid are ground fine and mixed with 5 parts of ethylene glycol. The mixture is heated under a nitrogen gas current with simultaneous distillation of the water of reaction, the reaction being continued for 1 hour at 140° and 3 hours at 200°. After this time the mixture is cooled slowly with addition of 10 parts of ethylene glycol at 140° and 10 parts of methanol at 60°. When 5° is reached the precipitate is filtered, washed with cold methanol and crystallized from chlorobenzene. Pale yellow crystals of melting point 254°–257° are obtained, which fluoresce with a red-violet shade in chlorobenzene solution (λmax. in CHCl₃: 365 nm). This compound corresponds to formula Ie.

b. 12 Parts of the para-carboxyphenyl triazole compound are stirred into 138 parts of chlorobenzene, 55 parts of the chlorobenzene are distilled (azeotropic drying) and the mixture then allowed to cool in the absence of moisture. One part of dry dimethyl formamide is added, followed by 4 parts of thionyl chloride, and the reaction with the chloride carried out by holding the mixture for 15–30 minutes at about 130°. On cooling the acid chloride formed is filtered, washed with benzene and vacuum dried. 10 Parts of the crude acid chloride are suspended in 110 parts of dry chlorobenzene at room temperature, 3.5 parts of 1-amino-2-hydroxybenzene and 1.75 parts of pyridine are added, the mixture raised to the refluxing temperature (130°–135°) under a nitrogen gas current with good stirring, and held at this temperature for 6 hours. On cooling the precipitated acid amide is filtered, washed with methanol and vacuum dried.

11 Parts of the acid amide are mixed with 10 times the amount of 1,2,4-trichlorbenzene with the addition of 5 % boric acid relative to the amide. The mixture is raised to the boiling temperature (210°–215°) under a nitrogen gas current and held at this temperature, with distillation of the water of reaction and some trichlorobenzene, for 4–5 hours to the end-point of the reaction. After cooling to 50°, 100 parts of methanol are added to precipitate the benzoxazole compound, which is filtered and purified by recrystallization as given in a). The same product as in a) is obtained in a yield of 8.7 parts.

EXAMPLE 4

10 Parts of the hydrazonoxime of formula

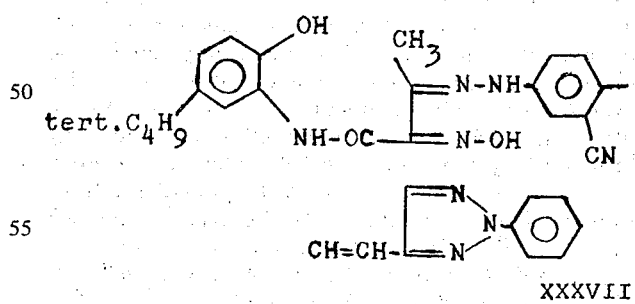

XXXVII are mixed with 20 parts of dimethyl acetamide, 20 parts of acetic anhydride and 20 parts of a technical mixture of pyridine bases. The mixture is raised in 2 hours to 80°, in 3 hours to 100° and in 1 hour to boiling temperature. As it cools the triazole compound settles out as a fine precipitate which is isolated in the normal way. The crude product is added to ortho-dichlorobenzene together with a catalytic amount of boric acid (about 5 % relative to the hydrazonoxime) and cyclized at boiling temperature to the azole compound as in Example 3b). The compound (λmax.: 365 nm, ε: 8.4×10⁴) corresponds to formula I f). Ring closure to the triazole can be accomplished with equal success using dimethyl sulphoxide, tetramethylene sulphone or phosphoric tris-(dimethylamide) as solvent in place of dimethyl acetamide.

If the hydrazonoxime used in this Example is replaced by a hydroazonoxime in which the 2-hydroxyphenylamino radical to the left is substituted by one or more lower alkyl and/or alkoxy groups or a phenyl group, compounds with very similar properties are obtained. All these compounds exhibit intense violet fluorescence in solution, and owing to their good fastness properties are suitable for the optical brightening of synthetic polymer materials.

The hydrazonoxime required as starting material can be formed, for example, by coupling a diazonium salt of 4-amino-2-cyano-β-(2'-phenylosotriazolyl-)-styrene with a corresponding acetoacetylaminobenzene with subsequent oxime formation.

EXAMPLE 5

20 Parts of the hydrazonoxime of formula

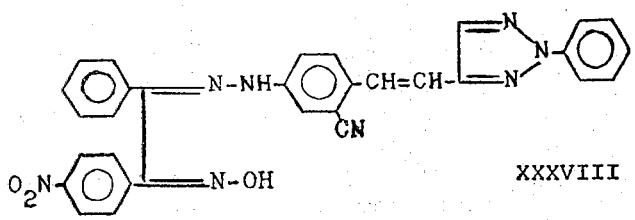

XXXVIII in mixture with 60 parts of propionic anhydride, 20 parts of pyridine and 40 parts of dimethyl formamide is cyclized to the triazole compound by stepwise heating as in Example 1. The compound is isolated in the normal way and reduced in acid medium as follows: 18 Parts of tin (II) chloride are suspended in 100 parts of glacial acetic acid, then hydrogen chloride is directed in with stirring until a clear solution is formed. 10 Parts of finely pulverized nitro compound are added in portions so that the internal temperature does not increase to above 50°. After stirring for a further hour at 70°–80° reduction is practically complete. On cooling the tin double salt of the amine is precipitated. It is separated from the soluble tin salts by filtration and after the addition of 4.5 parts of 35 % hydrochloric acid is diazotized at 0°–5° with 3 parts of sodium nitrite in the presence of 2-ethoxyethanol. After diazotization stirring is continued for several hours at 5°–10°. The excess nitrite is then decomposed with urea and the product coupled with 2.5 parts of 1-amino-3-methoxy-4-methylbenzene to the ortho-aminoazo compound. This is oxidatively cyclized in pyridine at about 70° in the presence of 1.2 parts of crystallized copper acetate by the introduction of air. The product has the formula

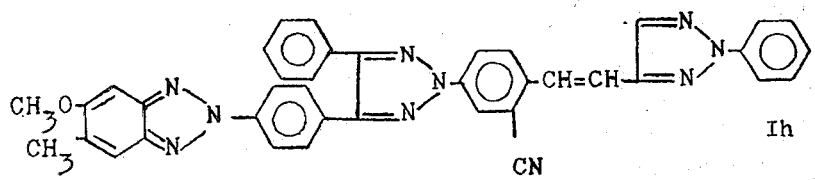

It is purified by recrystallization from chlorobenzene using decolourizing carbon and a trace of zinc dust.

If 2.65 parts of 2-naphthylamine are employed as coupling component in this Example in place of 1-amino-3-methoxy-4-methyl-benzene and the same procedure followed, an equally effective product is obtained. If 4.5 parts of 2-naphthylamine-1-sulphonic acid are used as coupling component, coupling is best carried out at 40°–50° with splitting off of the sulphonic acid group. These compounds are in the form of pale yellow powders and are particularly suitable for application in polyamide and polyester spinning melts to brighten the spun filament. Alternatively they can be obtained by the route described in Example 1.

EXAMPLE 6

51 Parts of the dry oxime hydrazone of formula

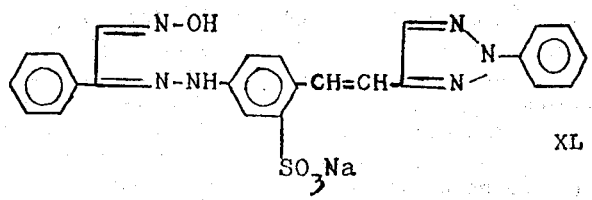

XL are added in portions to 200 parts of melted urea at about 130° with thorough stirring. The reaction mixture is stirred further for 4 hours at 160°. When the evolution of gas has ceased it is allowed to cool to 130°, at which temperature a mixture of 27 parts of concentrated sodium hydroxide solution, 20 parts of common salt and 20 parts of water is added. The precipitate is filtered with suction while hot and precipitated several times from aqueous dimethyl formamide with the aid of decolourizing carbon. Almost colourless crystals are obtained which dissolve readily in aqueous solvents and hot water to give solutions showing intense violet fluorescence. This compound has the formula Ii The oxime hydrazone of formula (XL) can be produced as follows. 35.7 Parts of 4-hydrazino-β-(2'-phenylosotriazolyl)-styrene-2-sulphonic acid (produced in analogy with the method given in Example 1 for the starting product there used) are suspended in 1000 parts of water and sufficient 30 % sodium hydroxide solution is added to adjust the pH to 6.5. A solution Ih of 15 parts of oximinoacetophenone in 48 parts of methanol is allowed to flow in and the mixture stirred for 1 hour at pH 5–6 and 60°–70°. When no further hydrazino compound is indicated the methanol is distilled from the mixture at reduced pressure, a concentrated sodium chloride solution added and the precipitate filtered with suction. After vacuum drying at 40° the compound can be reacted further without purification.

It contains approximately 80 % of the desired oxime hydrazone.

EXAMPLE 7

20 Parts of 4-hydrazino-2-cyano-β-(2'-phenylosotriazolyl)-styrene are added to 48 parts of dimethyl formamide with heating to 60°, on which it goes into solution almost completely. After cooling to 20° with vigorous stirring, 42 parts of 50 % acetic acid are added, followed in the course of 1 hour by portions of isonitrosobenzalacetone totalling 13 parts. The mixture is held for a further 3 hours at 20–25° with thorough stirring and then for 2 hours at 60° until no further hydrazine is indicated. It is cooled slowly, first to room temperature and then in an ice bath to 0°–3°. The yellow precipitate is filtered with suction and washed with ice-cold methanol to give a yellow-brown hydrazonoxime, melting point 195°–220°, which without further purification is suspended in 14 parts of dimethyl formamide at room temperature, with the consecutive addition of 12 parts of pyridine and 5.5 parts of acetic anhydride. The temperature is raised to 80° in 2 hours and in the following 2 hours to 100°. A dark brown solution is formed which is boiled for a further 30 minutes with reflux. It is cooled slowly to 0°–5° and the precipitate filtered with suction, washed with ice-cold methanol and crystallized from chlorobenzene with the aid of bleaching earth. The compound of formula

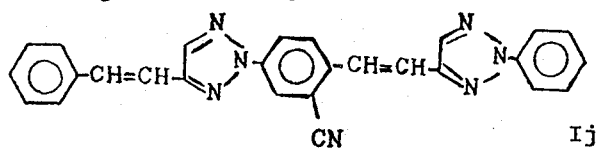

Ij is obtained in the form of pale yellow crystals, melting point 203°–205°, which fluoresce with a violet shade in chlorobenzene solution (λmax. 365 nm).

EXAMPLE 8

50 Parts of the hydrazonoxime of Example 7 are dissolved in 300 parts of pyridine with heating to 90°. In 45 minutes a solution of 40 parts of copper sulphate pentahydrate, 90 parts of water and 50 parts of pyridine is added dropwise with stirring. The reaction mixture is held for 2 ½ hours at 90°–100°, then 300 parts of pyridine-water mixture are distilled with vacuum, the mixture cooled and the precipitate filtered with suction. It is washed with 1000 parts of dioxan and then with water until the wash water is colourless, and dried at 60° with vacuum. The yellow-brown triazole-N-oxide formed melts at 229°–233° and corresponds to the formula

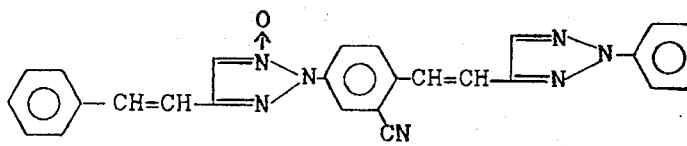

27 Parts of this triazole-N-oxide are dissolved in 300 parts of dioxan and 2 parts of water at 85°. For 5 hours a powerful current of hydrogen chloride gas is directed into the well stirred solution. After a short time it begins to fluoresce and lemon crystals settle out. On completion of the reaction time the batch is cooled and the product filtered with suction. Crystallization from chlorobenzene with the aid of bleaching earth results in lemon crystals with melting point 202°–204°, which fluoresce with a violet shade in chlorobenzene solution and have the formula

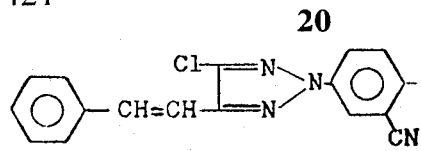

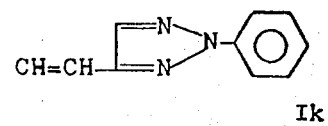

Ik (λmax. in chloroform: 370 nm)

EXAMPLE 9

28 parts of the triazole-N-oxide of formula

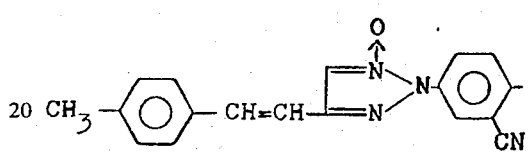

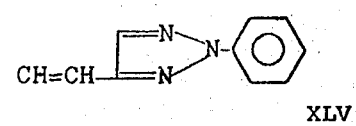

XLV melting point 233°–235°, which can be produced in analogy with the procedure of Examples 7 or 8, are employed for reaction in otherwise complete accordance with Example 8, and lemon crystals, melting point 194°–195°, are obtained which exhibit violet fluorescence in chlorobenzene solution and agree with formula

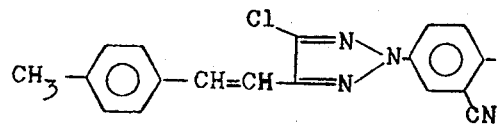

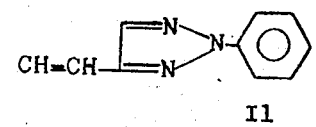

Il (λmax. in chloroform: 373 nm)

EXAMPLE 10

4.5 Parts of the phosphonic ester of formula

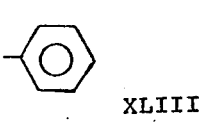

XLIII

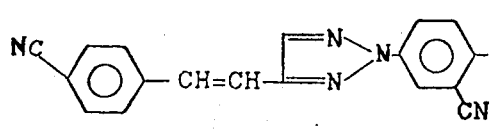

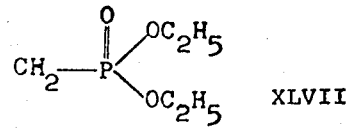

XLVII are dissolved with 1.8 parts of 2-phenyl-1,2,3-triazole-4-aldehyde in 40 parts of freshly distilled dimethyl formamide. At 30° a solution of 6 parts of sodium methylate in 12 parts of methyl alcohol is added. The mixture is stirred for 1 hour at 40° and then cooled and set with 20 parts of cold methanol. The yellow precipitate is filtered with suction, washed twice with 10 parts of methanol and crystallized from ortho-dichlorobenzene. The product in the form of pale yellow crystals, melting point 264°–266°, shows blue-violet fluorescence in chlorobenzene solution and has the formula

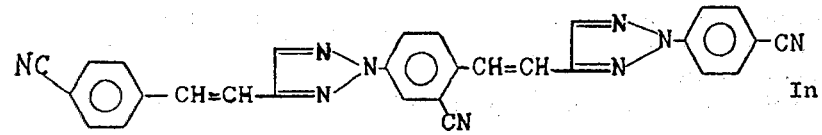

($\lambda$max. in chloroform: 367 nm)

EXAMPLE 11

30 Parts of the phosphonic ester of formula (XLVII) along with 13.5 parts of 2-(4'-cyanophenyl)-4-formyl-1,2,3-triazole are dissolved in 200 parts of distilled dimethyl formamide. A solution of 3.7 parts of sodium methylate in 8 parts of methanol is added at 30° and the batch stirred for 1 hour at this temperature, after which 100 parts of methanol are added, the mixture cooled to 10° and the product isolated by filtration with suction. On recrystallization from ortho-dichlorobenzene, pale yellow crystals with melting point 317°–319° are obtained, which fluoresce with a blue-violet shade in chlorobenzene solution and corresponds to the formula

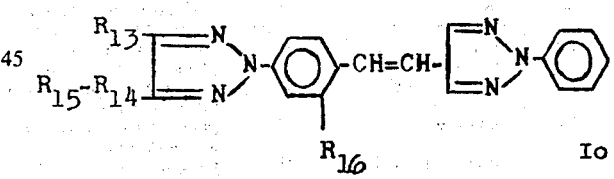

($\lambda$max. in chloroform: 369 nm)

The phosphonic ester of formula (XLVII) is formed as follows. A mixture of 8 parts of 2-(3'-cyano-4'-methyl)-4-formyl-1,2,3-triazole and 9.5 parts of 4-cyanobenzylphosphonic diethylester in 50 parts of dry dimethyl formamide is set at room temperature with 8 parts of a 30 % solution of sodium methylate in methanol. It is reacted for 1 hour at 40° with stirring and after the addition of 10 parts of methanol is cooled to 10°. The product is isolated by filtration with suction and vacuum dried at 60°. Almost white, needle-shaped crystals are obtained in a yield of 11 parts, which following recrystallization from chlorobenzene melt at 233°–235°. They are of formula

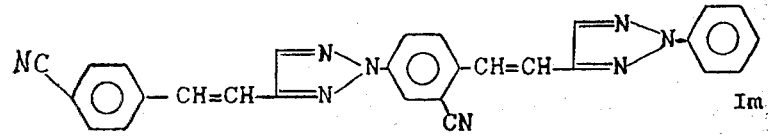

3.1 Parts of the crystalline product are suspended in 100 parts of dry carbon tetrachloride, set for reaction with 2 parts of N-bromosuccinimide and 0.1 part of benzoyl peroxide and reacted for 8 hours with reflux. The precipitated succinimide is filtered off, the filtrate condensed by evaporation and the residue recrystallized from toluene. 4 Parts of the resulting bromomethyl compound, melting point 114°–118°, are converted with triethyl phosphite into the phosphonic diethyl ester of formula (XLVII), crude melting point 210°–220°, following the known method of Michaelis-Arbusov (A. Michaelis, Liebigs Ann. Chem. 326, (1903), 129).

In table 1 below further optical brighteners according to this invention are specified which have the general formula

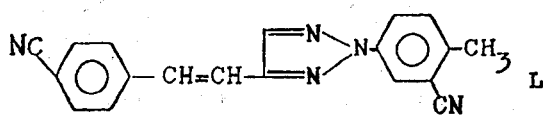

and can be produced in analogy with the operating procedures of Examples 1 or 7.

Table 1

| Example No. | $R_{16}$ | $R_{13}$ | $R_{14}$ | $R_{15}$ | Fluorescence shade in chlorobenzene |
|---|---|---|---|---|---|
| 12 | CN | $CH_3$ | ⟨O⟩ | 5-iso-Octylbenzoxazolyl-2 | red-violet |
| 13 | do. | do. | do. | 5-Methylbenzoxazolyl-2 | do. |
| 14 | do. | do. | do. | 5-Ethylbenzoxazolyl-2 | do. |
| 15 | do. | do. | do. | 5-Phenylbenzoxazolyl-2 | do. |
| 16 | do. | do. | do. | 5-tert.Amylbenzoxazolyl-2 | do. |
| 17 | do. | do. | do. | 5-Chlorobenzoxazolyl-2 | do. |
| 18 | do. | do. | do. | 6-Chlorobenzoxazolyl-2 | do. |
| 19 | do. | do. | do. | 6-Phenylbenzoxazolyl-2 | do. |
| 20 | do. | do. | do. | 5-Cyanobenzoxazolyl-2 | violet |
| 21 | do. | do. | do. | 6-Cyanobenzoxazolyl-2 | do. |

Table 1 — Continued

| Example No. | $R_{16}$ | $R_{13}$ | $R_{14}$ | $R_{15}$ | Fluorescence shade in chlorobenzene |
|---|---|---|---|---|---|
| 22 | do. | do. | do. | 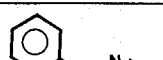 | do. |
| 23 | H | H | —CH=CH— | Diphenylyl-4- | blue-violet |
| 24 | CN | H | do. |  | blue |
| 25 | CN | H | do. |  | do. |
| 26 | CN | H | do. |  | blue-violet |
| 27 | CN | H | do. |  | blue |
| 28 | H | H | do. | do. | blue-violet |

The following Table 2 gives details of a further number of compounds which have the general formula

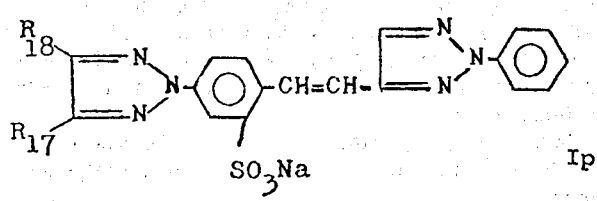

Ip and are produced in analogy with the procedure of Example 6. These compounds, which exhibit intense violet fluorescence in aqueous solution, are distinguished by the meanings of the symbols $R_{17}$ and $R_{18}$ and the hydroxyimino ketone used for their synthesis.

Following the procedure of Example 1 or 7 and employing appropriate starting materials in approximately equivalent amounts, the compounds in the following Table III, and which agree with the formula

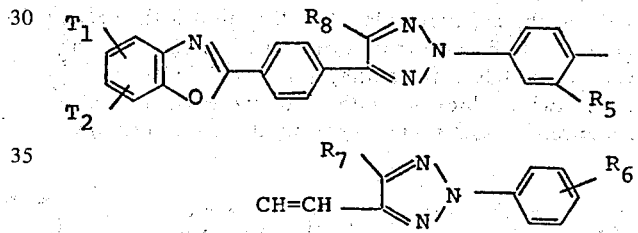

may be produced.

Table 2

| Example No. | $R_{17}$ | $R_{18}$ | Hydroxyimino ketone |
|---|---|---|---|
| 29 | phenyl | $CH_3$ | hydroxyimino propiophenone |
| 30 | 4-methylphenyl | H | para-methyl hydroxyiminoacetophenone |
| 31 | 4-chlorophenyl | H | para-chloro hydroxyiminoacetophenone |
| 32 | 4-methoxyphenyl | H | para-methoxy hydroxyimino acetophenone |
| 33 | 3-cyanophenyl | $CH_3$ | 1-(3'-cyanphenyl)-1-hydroxyimino acetone |
| 34 | 4-diphenylyl | H | para-phenyl hydroxyimino acetophenone |
| 35 | phenyl | phenyl | benzile monoxime |
| 36 | ethyl | $CH_3$ | hydroxyimino diethyl ketone |
| 37 | phenyl | $C_2H_5$ | hydroxyimino butyrophenone |
| 38 | 4-carboxyphenyl | $CH_3$ | 1-(4'-carboxyphenyl)-1-hydroxyimino acetone |
| 39 | 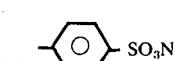 | 1-(4'-sulphenyl)-1- | hydroxyimino acetone |
| 40 |  | $CH_3$ | 1-(3'-sulphophenyl)-1-hydroxyimino acetone |
| 41 | 4-methoxyphenyl | Cl | para-methoxy hydroxyimino acetophenone |

TABLE III

| Example No. | $R_5$ | $R_6$ | $R_7$ | $R_8$ | $T_1$ | $T_2$ | Fluorescence shade |
|---|---|---|---|---|---|---|---|
| 42 | —SO$_3$H | 4—Cl | Cl | H | H | H | Bluish in cellosolve/water |
| 43 | —SO$_2$NH$_2$ | 4—CH$_3$ | —CH$_2$OH | Cl | H | H | Violet in chlorobenzene |
| 44 | —CONH$_2$ | 4—CN | —CH$_3$ | CH$_3$ | 4CN | 6—CN | Bluish violet in chlorobenzene |
| 45 | —CN | 4—CONH$_2$ | —CH$_2$Cl | CH$_3$ | 5—OCH$_3$ | H | do. |
| 46 | —CN | H | —CH$_2$OCOCH$_3$ | CH$_3$ | H | H | Violet in chlorobenzene |
| 47 | —CN | H | CH$_3$ | CH$_3$ | H | H | Red-violet in chlorobenzene |
| 48 | —CN | CH$_3$—C(CH$_3$)—CH$_3$ | H | CH$_3$ | 5—CN | H | Violet in chlorobenzene |

Application Example A

A mixture of 10 parts of the compound of formula I f, 22 parts of a highly sulphonated castor oil, 8 parts of sodium dioctylphenylpolyglycol etheroxyacetate containing 40 ethenoxy groups in the molecule, and 80 parts of water is prepared for comminution in a suitable machine, for example a sand mill. Grinding is continued until a particle size distribution of zero 0.5-2 microns is reached for the major proportion of the dispersion.

A fabric of polyester fibre, e.g. polyethylene terephthalate, is padded with a solution of 20 parts of the ground dispersion in 1000 parts of water at room temperature and with an expression giving an increase of 80 % on the dry weight. After intermediate drying for 30 minutes at 60° the brightener is thermofixed for 1 minute at 220°. A pronounced white effect is obtained on the fabric. This brightening method is of course equally effective with polyester fibres of the type synthesized from terephthalic acid and 1,4-dimethylol cyclohexane. If a dispersion whose active substance corresponds to the product of Example 16 is used in place of the one described above, comparable white effects are obtained.

Application Example B

In the tank of a melt spinning machine 200 parts of polyethylene terephthalate are melted at 280° in a nitrogen atmosphere, and 0.4 parts of the brightener compound of formula I e stirred into the melt. When it has homogeneously dissolved 4 parts of titanium dioxide are added as delustrant, with continued stirring for homogeneous distribution. The melt is spun through a nozzle, the newly formed filament cooled by a water jet and then cold drawn and wound on bobbins.

Textiles made of this spun filament are very much whiter in appearance than comparable products of filament spun without a brightener additive. In place of the aforestated compound, one of the compounds disclosed in Examples 13 or 14 can be chosen, with which similar white effects are obtained.

Application Example C

In a stainless steel autoclave fitted with a stirrer and a descending cooler, a batch of 1000 parts of dimethyl terephthalate, 665 parts of ethylene glycol, 0.55 parts of manganese acetate, 0.18 parts of antimony trioxide and 0.6 parts of the compound of formula I e is heated for reaction. Splitting off of the methanol begins at about 160° and takes 2 ½ hours to complete. Subsequently 4 parts of titanium dioxide and 0.3 parts of phosphoric acid are metered into the melt, the pressure in the autoclave reduced to below 1 mm and the temperature held at 290° until the desired degree of polymerization is reached. The polyester thus formed is spun in filament form by the normal method at 2-5 atmospheres excess pressure (inert gas). The filament exhibits a high degree of whiteness which is very resistant to light and washing.

Application Example D

A batch of polyamide 6 (poly-ε-caprolactam) granules is powdered in a mixer with 0.01–0.05 % of its weight of the compound of Example 3 or 13. It is transferred to a melt spinning machine, where it is melted under nitrogen for 30 minutes at about 300°, stirred for 15 minutes at this temperature, raised to the spinning temperature, 285°, and spun as monofilament at 3-5 atmospheres excess pressure (nitrogen). In daylight the filaments fluoresce with a violet shade. They appear much whiter and brighter than filament with no incorporated brightener. If in place of polyamide, polyester or polypropylene is set with one of the stated brighteners and spun at 290° or 260° respectively, monofilaments showing a higher degree of whiteness than unbrightened filament are obtained.

Application Example E

In an autoclave with stirrer, a batch of 1000 parts of caprolactam, 30 parts of water and 0.8 parts of the brightener of formula I e is maintained at 240° for 4 hours under pressure and then for 1 hour with the pressure released. The polyamide melt thus formed is extruded through a slot die to be immediately chilled in water, cut into chips and dried. Comparison with the chips obtained in a comparative trial without a brightener additive shows that the stated compound imparts a greatly superior degree of whiteness.

Application Example F

In a mixer, 100 parts of polypropylene granules are powdered with 0.01 part of compound I h. The material is worked up on a three-roll mill at 144°–120° and then either extrusion moulded as panels or regranulated and injection moulded. The moulded products exhibit greatly improved whiteness over unbrightened articles. The polypropylene can be replaced by low-density or high-density polyethylene, another polyolefin, polystyrene or cellulose acetate,

Application Example G

A solution of 0.005 parts of the compound of formula I j in a plasticizer is blended with 100 parts of moulding material consisting of 65 parts of polyvinyl chloride and 35 parts of a plasticizer, e.g. dioctyl phthalate, and containing 2 %, relative to the polymer content, of a stabilizer. The material is worked on a roll mill for 10 minutes at 150°–160° and extruded as film. If opaque film is desired, 2.5 % titanium dioxide is incorporated in the material before processing. The films have a superior appearance to comparative films containing no brightener additive.

Application Example H 0.01 Part of the compound of formula I e is intimately mixed with 100 parts of polyethylene terephthalate granules for injection moulding. The mouldings of this material are of superior appearance to mouldings without a brightener additive.

Application Example I

White table linen of 50/50% cotton/nylon 6 blend fabric is washed at 30°–60° and liquor ratio 20:1 in an alkaline bath containing, per litre of water, 5 grams of a commercial anionic detergent with an incorporated 0.01 grams of one of the brightening agents described in Examples 6 or 29 to 41 and an amount of sodium hypochlorite solution equivalent to 0.1 gram of available chlorine per litre. On the cotton and nylon components of the fabric, excellent brightness effects are obtained which show good fastness to light, peroxide and chlorite.

Application Example K

Unbleached cotton yarn is treated for 1 hour at 85°–95° and liquor ratio 20:1 in an aqueous bath containing, per litre, 0.08 grams of one of the brightening agents specified in Example 6 or 29 to 41 and 2 grams of sodium chlorite, with subsequent rinsing and drying. A brilliant white effect of very good fastness is obtained on the yarn.

Application Example L

A fabric of polyamide 66 fibre is treated for 30 minutes at 80°–90° and liquor ratio 40:1 in an aqueous bath set with 15 grams per litre of the brightening agent described in Example 6., with subsequent rinsing and drying. The fabric displays a pronounced, clear white effect which is very fast to light and chlorite.

What is claimed is:

1. A compound of formula

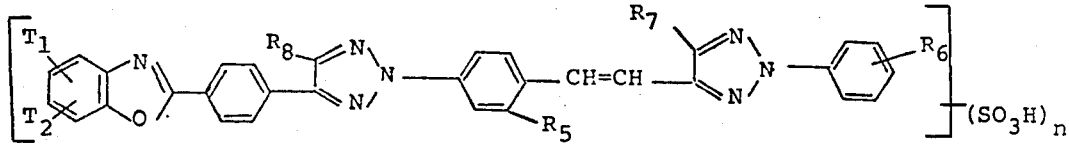

in which $R_5$ is sulpho, sulphonic amide, carboxylic amide or cyano, $R_6$ is hydrogen, chlorine, alkyl of 1 to 4 carbon atoms, carboxylic amide or cyano, $R_7$ is hydrogen, chlorine, methyl, hydroxymethyl, chloromethyl or acetoxymethyl, $R_8$ is hydrogen, chlorine or methyl, $n$ is 0 or a whole number, and either $T_1$ is hydrogen, chlorine, phenyl, alkyl of 1 to 8 carbon atoms, alkoxy of 1 to 4 carbon atoms, or cyano and $T_2$ signifies hydrogen, or $T_1$ and $R_2$ both signify cyano.

2. A compound according to claim 1 wherein, where $T_1$ signifies an alkyl radical, such alkyl radical is of 1 to 4 carbon atoms.

3. A compound of claim 2, wherein $T_1$ is hydrogen or a $C_{1-4}$ alkyl radical and $T_2$ is hydrogen.

4. A compound according to claim 1 wherein $n$ is 0 or 1 to 3.

5. A compound of claim 3 and of formula

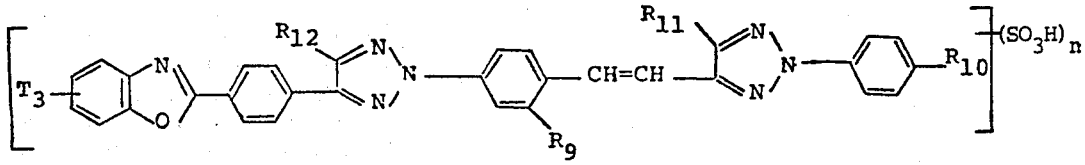

where $R_9$ is cyano or sulpho, $R_{10}$ is hydrogen or cyano, $R_{11}$ is hydrogen, chlorine or methyl, $R_{12}$ is hydrogen, chlorine or methyl, $T_3$ is hydrogen, methyl or tertiary butyl, and $n$ is 0 or a whole number.

6. A compound according to claim 5 wherein n is 0 or 1 to 3.

7. The compound of claim 6 which is of formula

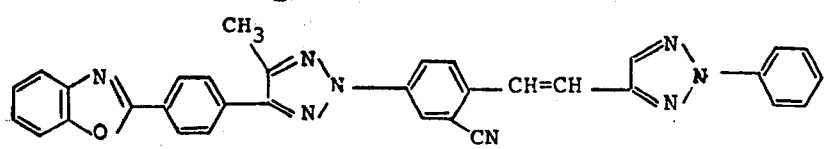
8. The compound of claim 7 which is of formula
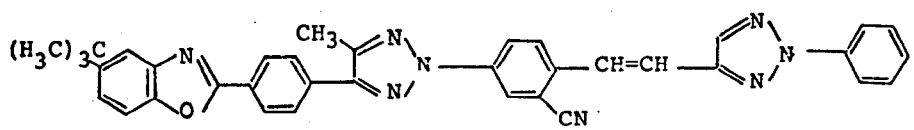
* * * * *